(12) United States Patent
Nawata et al.

(10) Patent No.: US 12,411,322 B2
(45) Date of Patent: Sep. 9, 2025

(54) LENS AND OPTICAL SYSTEM DEVICE

(71) Applicant: SCIVAX CORPORATION, Kawasaki (JP)

(72) Inventors: Akifumi Nawata, Kawasaki (JP); Satoru Tanaka, Kawasaki (JP)

(73) Assignee: SCIVAX CORPORATION, Kawasaki (JP)

( * ) Notice: Subject to any disclaimer, the term of this patent is extended or adjusted under 35 U.S.C. 154(b) by 354 days.

(21) Appl. No.: 17/916,061

(22) PCT Filed: Mar. 30, 2021

(86) PCT No.: PCT/JP2021/013719
§ 371 (c)(1),
(2) Date: Sep. 30, 2022

(87) PCT Pub. No.: WO2021/201052
PCT Pub. Date: Oct. 7, 2021

(65) Prior Publication Data
US 2023/0168478 A1    Jun. 1, 2023

(30) Foreign Application Priority Data

Mar. 31, 2020   (JP) .................. 2020-064303

(51) Int. Cl.
*G02B 13/18*    (2006.01)
*G02B 3/02*    (2006.01)
(Continued)

(52) U.S. Cl.
CPC .............. *G02B 13/18* (2013.01); *G02B 3/02* (2013.01); *G02B 5/0273* (2013.01); *G02B 5/3025* (2013.01)

(58) Field of Classification Search
CPC ........ G02B 13/18; G02B 3/02; G02B 5/0273; G02B 5/3025
(Continued)

(56) References Cited

U.S. PATENT DOCUMENTS

2006/0279720 A1*  12/2006  Sekigawa .............. G03B 27/72
                                                            355/53
2010/0091490 A1    4/2010  Reichel et al.
2021/0364859 A1   11/2021  Mochida et al.

FOREIGN PATENT DOCUMENTS

JP    2002-228921 A    8/2002
JP    2010-074167 A    4/2010
(Continued)

OTHER PUBLICATIONS

International Search Report issued in corresponding International Patent Application No. PCT/JP2021/013719 dated Jun. 22, 2021.

*Primary Examiner* — William Choi
(74) *Attorney, Agent, or Firm* — Morgan, Lewis & Bockius LLP (57) ABSTRACT

A lens and an optical system device are provided which can measure optical characteristics of a light source or an optical element with a simple structure. A lens 1 has an optical axis, and includes an incident surface F and an emit surface B. The incident surface F and the emit surface B are formed so as to emit incident light to the incident surface F from a first position O at an irradiation angle $\theta$ relative to the optical axis from the emit surface B at an emit angle $\theta/m$ (where m>1) relative to the optical axis by refraction at the incident surface F and at the emit surface B, and formed in such a way that apparent positions of lights emitted from the emit surface B all begin from a second position P. Moreover, an optical system device includes the lens 1 and a diffuser panel that diffuses emitted light from the lens 1.

20 Claims, 5 Drawing Sheets

(51) Int. Cl.
*G02B 5/02* (2006.01)
*G02B 5/30* (2006.01)

(58) Field of Classification Search
USPC .......................................................... 359/648
See application file for complete search history.

(56) References Cited

FOREIGN PATENT DOCUMENTS

| JP | 2013033163 A | * | 2/2013 |
| JP | 2018-120664 A | | 8/2018 |

* cited by examiner

LENS AND OPTICAL SYSTEM DEVICE

TECHNICAL FIELD

The present disclosure relates to a lens and an optical system device that utilizes the same.

BACKGROUND ART

In recent years, light emitting elements like LEDs are utilized for a light source. Moreover, in order to control various lights of a light source, optical elements, such as a Micro Lens Array (MLA) and a Diffraction Optical Element (DOE), are also developed. It is necessary for such light emitting elements and optical elements to evaluate the optical characteristics like light orientation thereof.

An example evaluation method is to rotate a light source or an imaging unit by a goniometer, and to measure a light intensity at such an angle using a sensor. In this case, although measurement itself is relatively easy, since the measurement itself is executed spot by spot, there is a technical problem such that a quite long time is necessary to obtain a piece of light orientation data. Moreover, there is also a technical problem such that a goniometer is quite expensive (see, for example, Patent Document 1).

CITATION LIST

Patent Literature

Patent Document 1: JP 2016-151438 A

SUMMARY OF INVENTION

Technical Problem

Hence, a method of causing light emitted from light emitting elements or optical elements to collide a visualization plate, and of observing the way of light orientation is considered. In this case, although a piece of orientation data can be measured within a short time, the light orientation angle that can allow light to collide the visualization plate has a limit, and thus there is a technical problem such that light with a large light orientation angle cannot be measured.

Hence, an objective of the present disclosure is to provide a lens and an optical system device which can measure optical characteristics of a light source or an optical element with a simple structure.

Solution to Problem

A lens according to the present disclosure has an optical axis, and includes an incident surface and an emit surface,
in which the incident surface and the emit surface are formed so as to emit incident light to the incident surface from a first position at an irradiation angle $\theta$ relative to the optical axis from the emit surface at an emit angle $\theta/m$ (where m>1) relative to the optical axis by refraction at the incident surface and at the emit surface, and formed in such a way that apparent positions of lights emitted from the emit surface all begin from a second position.

In this case, the incident surface is formed in a refractive shape that causes the incident light from the first position at the irradiation angle $\theta$ to be emitted to, from the second position, an intersection between a direction at an angle $\theta/m$ and the emit surface, and the emit surface is formed in a shape that refracts light emitted through the incident surface from the first position in the direction at the emit angle $\theta/m$.

Moreover, m can be an arbitrary number greater than 1, and it is preferable that m≥2. More specifically, when m=2, the emit angle can be the half of the incident angle.

Moreover, an optical system device according to the present disclosure includes:
a lens formed so as to emit incident light from a first position at an irradiation angle $\theta$ relative to an optical axis at an emit angle $\theta/m$ (where m>1) relative to the optical axis, and formed in such a way that apparent positions of emitted lights all begin from a second position; and
a diffuser panel that diffuses the light emitted from the lens.

In this case, the above optical system device may further include a wavelength selective filter that allows only light with a certain wavelength to pass through.

Moreover, the above optical system device may further include an imaging element that detects the light from the diffuser panel.

Furthermore, the above optical system device may further include an electronic shutter that adjusts a time at which the light enters the imaging element.

Still further, the above optical system device may further include an arithmetic processing unit that calculates light orientation characteristics from information on the light detected by the imaging element.

Yet still further, the above optical system device may further include a display device that displays the light orientation characteristics of the light detected by the imaging element.

Moreover, the above optical system device may further include an antireflection member which is placed around the diffuser panel so as to be in parallel with the optical axis of the lens and which absorbs incident light from the diffuser panel.

Furthermore, the above optical system device may further include a light source that emits light to the first position.

Still further, the above optical system device may further include an imaging lens which forms an image with the light from the light source, and which emits the imaging light to the first position.

Yet still further, the above optical system device may further include a polarization filter that allows only light polarized in a certain direction to pass through.

The lens of the above optical system device may be the lens according to the present disclosure.

Advantageous Effects of Invention

The lens according to the present disclosure can make the light orientation angle of light from a light source or from an optical element as 1/m (where m>1). Hence, the optical system device according to the present disclosure that utilizes such a lens can measure the optical characteristics of the light source or the optical element with a simple structure.

DESCRIPTION OF EMBODIMENTS

Figure 1:
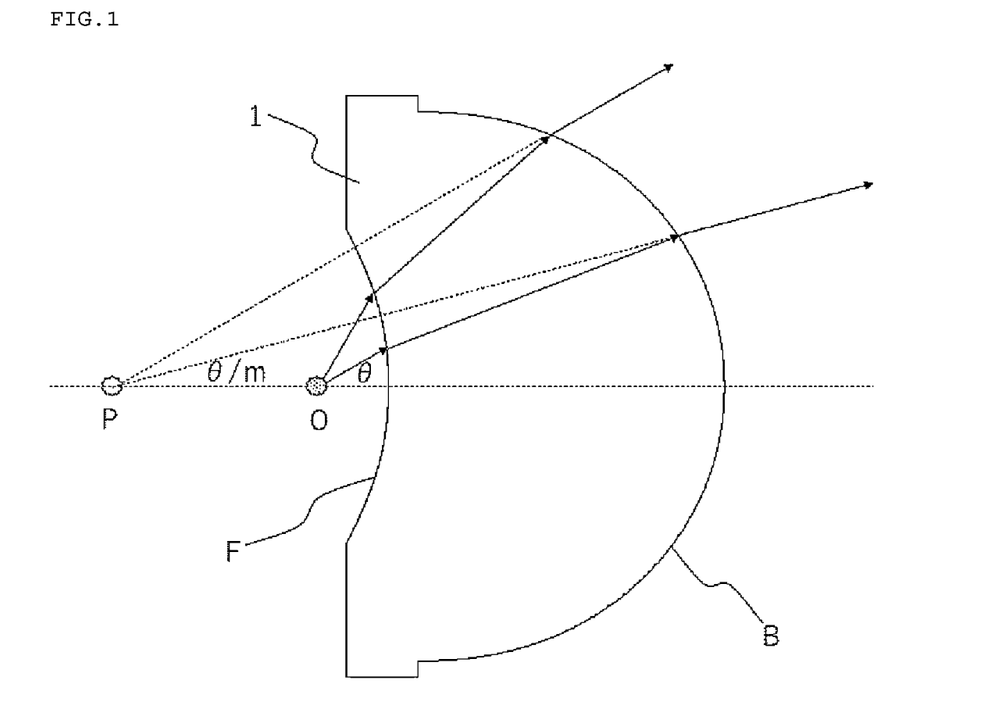
FIG. 1 is a diagram for describing a lens according to the present disclosure.

A lens 1 according to the present disclosure will be described below. As illustrated in FIG. 1, the lens 1 according to the present disclosure has an optical axis, and mainly includes an incident surface F and an emit surface B.

The incident surface F and the emit surface B emit incident light to the incident surface F from a first position O at an irradiation angle $\theta$ relative to the optical axis from the emit surface B at an emit angle $\theta/m$ (where m>1) relative to the optical axis by refraction at the incident surface F and at the emit surface B. In this example, m can be equal to or greater than two, and also can be equal to or greater than three. More specifically, when m=2, the emit angle can be equal to or smaller than the half of the incident angle. Moreover, the incident surface F and the emit surface B are formed in such a way that the apparent positions of light emitted from the emit surface B all begin from a second position P. In this case, the apparent position (the second position P) means a position of a point that intersects the optical axis when the light beam of light emitted from the emit surface B is extended in the optical axis direction.

This will be described in more detail. The incident surface F is formed in a refractive shape that causes the incident light from the first position O at the irradiation angle $\theta$ to be emitted to, from the second position P, the intersection between the direction at an angle $\theta/m$ and the emit surface B.

Moreover, the emit surface B is formed in a shape that refracts light emitted through the incident surface F from the first position O in the direction at the emit angle $\theta/m$.

Although the incident surface F and the emit surface B can be formed arbitrary, as an example, those may be formed as follow.

Figure 2:
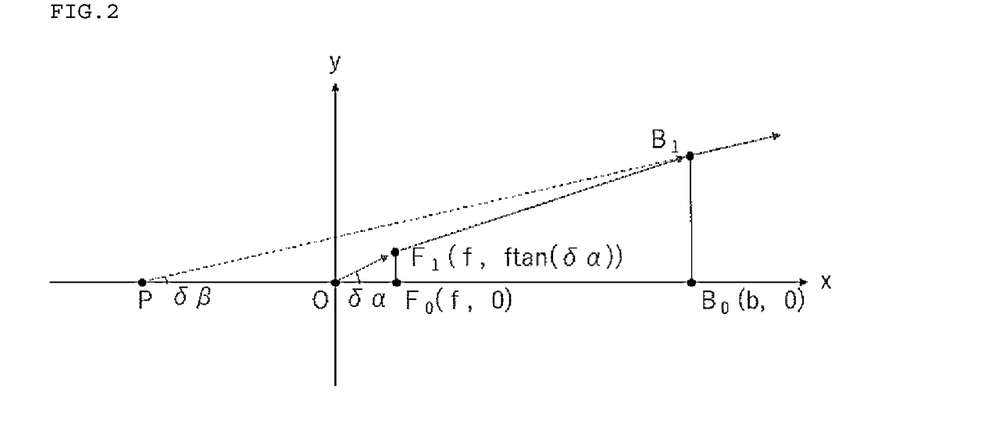
FIG. 2 is a diagram for describing a forming method of the lens according to the present disclosure.

(1) As illustrated in FIG. 2, an arbitrary first position O (origin) and an optical axis (x-axis) that passes through the first position O are decided.

(2) In an xy plane including the optical axis (the paper surface of FIG. 2), a point $F_0$ (f,0) that represents the incident surface F and a point $B_0$ (b,0) that represents the emit surface B are set.

(3) A second position P (−p,0) is set on the optical axis and at the opposite side to the incident surface F relative to the first position O.

(4) Minute angles $\delta\alpha$ and $\delta\beta$ that satisfy a relation $\delta\beta=\delta\alpha/m$ (where m>1) are defined.

(5) Points that represent the incident surface F are defined as $F_0$, $F_1$, $F_2$, and $F_n$ (where n is a natural number), etc., in sequence from the optical-axis side, and points that represent the emit surface B are defined as $B_0$, $B_1$, $B_2$, and $B_n$ (where n is a natural number), etc., are defined in sequence from the optical-axis side.

(6) $F_1=(f, f\,\tan(\delta\alpha))$ and $B_1=((b+1),(b+1)\tan(\delta\beta))$ are defined.

(7) Since vectors $OF_1$, $F_1B_1$ and $LB_1$ are set, in accordance with the Snell's law, a slope $\phi_{F1}$ of the incident surface F relative to the x-axis at which light beam $OF_1$ is refracted so as to be light beam $F_1B_1$, and a slope $\phi_{B1}$ of the emit surface B relative to the x-axis at which light beam $F_1B_1$ is refracted so as to be light beam $LB_1$ are obtained.

An intersection between a straight line which passes through the point $F_1$ and which has a slope $\phi_{f1}$, and a straight line which passes through the point O and which has a slope $2\delta\alpha$ becomes $F_2$.

Moreover, an intersection between a straight line which passes through the point $B_1$ and which has a slope $\phi_{b1}$, and a straight line which passes through the point L and which has a slope $2\delta\beta$ becomes $B_2$.

(8) Since vectors $OF_{n-1}$, $F_{n-1}B_{n-1}$ and $LB_{n-1}$ are set through the similar calculation, in accordance with the Snell's law, a slope $\phi_{F(n-1)}$ of the emit surface B relative to the x-axis at which light beam $OF_{n-1}$ is refracted and becomes light beam $F_{n-1}B_{n-1}$, and a slope $\phi_{B(n-1)}$ of the emit surface B relative to the x-axis at which the light beam $F_{n-1}B_{n-1}$ is refracted and becomes light beam $LB_{n-1}$ are obtained.

An intersection between a straight line which passes through the point $F_{n-1}$ and which has a slope $\phi_{F(n-1)}$, and a straight line which passes through the point O and which has a slope $n\delta\alpha$ becomes $F_n$.

Moreover, an intersection between a straight line which passes through the point $B_{n-1}$ and which has a slope $\phi_{B(n-1)}$ and a straight line which passes through the point L and which has a slope $n\delta\beta$ becomes $B_n$.

Figure 3:
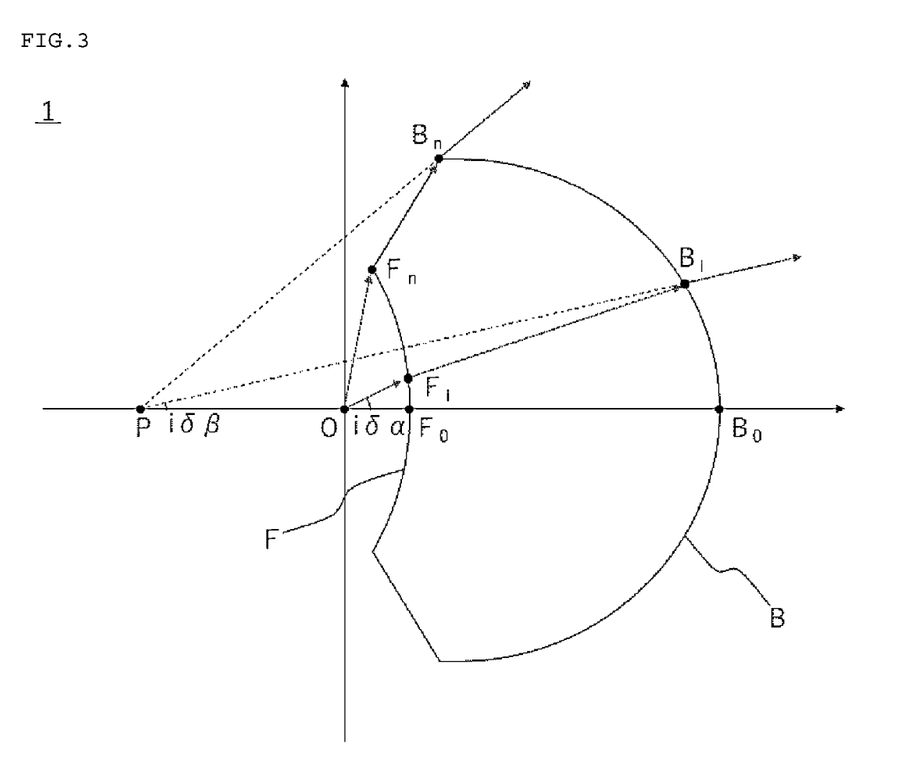
FIG. 3 is a diagram for describing the forming method of the lens according to the present disclosure.

(9) By interconnecting the points $F_0$, $F_1$, $F_2$ and $F_n$ (where n is a natural number), etc., and $B_0$, $B_1$, $B_2$ and $B_n$ (where n is a natural number), etc., the incident surface F and the emit surface B on the xy plane can be formed (see FIG. 3). Note that a space between the point $F_n$ and the point $B_n$ may be any shape as far as it does not disrupt light beam $F_nB_n$.

(10) The incident surface F of the lens 1 and the emit surface B thereof according to the present disclosure can be formed by rotating the planar shape formed as described above around optical axis.

Note that the lens 1 of the present disclosure may have a support portion, etc., that supports the lens 1 at a portion that does not interfere with the incident surface F and with the emit surface B, e.g., a side surface.

Figure 4:
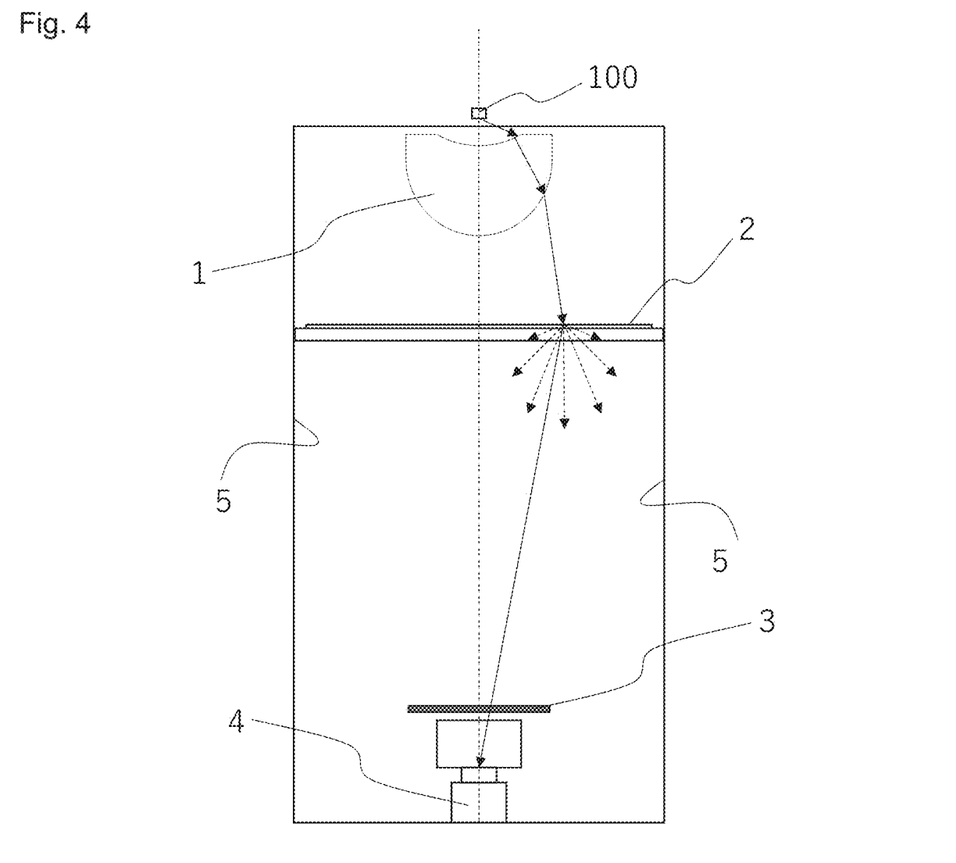
FIG. 4 is a schematic cross-sectional view illustrating an optical system device according to the present disclosure.

Moreover, as illustrated in FIG. 4, an optical system device according to the present disclosure is for measuring the optical characteristics of a measurement object 100, and mainly includes the lens 1 and a diffuser panel 2.

The measurement object 100 in this example means optical elements, etc., which control incident light and emit the controlled light, such as a light emitting element of an LED which emits light itself, a Micro Lens Array (MLA), and a Diffraction Optical Element (DOE). Needless to say, it is not limited to those examples as far as it can emit incident light.

The lens 1 is formed in such a way that incident light from the first position O at an irradiation angle $\theta$ relative to the optical axis is emitted at an emit angle $\theta/m$ (where m>1) and the apparent positions of emitted lights all begin from the second position P. That is, the light orientation angle of light from a light source 6 or from an optical element can be set to 1/m (where m>1). In this example, m can be equal to or greater than two, and also equal to or greater than three. Hence, the incident angle of light emitted to the diffuser panel 2 can be reduced, and thus the diffuser panel 2 can be downsized. When, for example, m=2 is set, the emit angle can be equal to or smaller than the half of the incident angle. An example of such a lens is the above-described lens 1 of the present disclosure.

The diffuser panel 2 diffuses light emitted from the lens 1. Hence, the three-dimensional orientation of light emitted from the lens 1 can be converted into a two-dimensional image.

Moreover, the optical system device of the present disclosure may include a wavelength selective filter 3. The wavelength selective filter 3 is an optical element which allows only light with a certain wavelength to pass and which does not allow light with the other wavelength to pass. When the wavelength of light to be detected from the measurement object is known in advance, by applying the wavelength selective filter 3 that allows such light to pass, a measurement can be executed with the other light that becomes noise being cut. The wavelength selective filter 3 may be placed between the measurement object 100 and an imaging element 4, preferably, between the diffuser panel 2 and the imaging element 4, and more preferably, immediately ahead of the imaging element 4 in such a way that light other than the light with the certain wavelength does not enter the imaging element 4. Example wavelength selective filters 3 are a bandpass filter, a long-pass filter, a short-pass filter, and a color filter, etc.

Moreover, in order to pick up the optical characteristics not by visual observation results but as data, as illustrated in FIG. 4, the optical system device of the present disclosure may include the other devices, such as the imaging element 4 and an arithmetic processing unit.

The imaging element 4 detects light from the diffuser panel 2. An example imaging element 4 applicable is an element that converts an image into electric signals, e.g., a solid-state imaging element 4, such as a CCD imaging element or a CMOS imaging element. Moreover, the imaging element 4 that has a sensitivity with not only visible light but also infrared light, ultraviolet and X ray can be also applied. Note that the imaging element 4 may additionally include an electronic shutter, etc., which adjusts a time at which light enters the imaging element 4.

The arithmetic processing unit calculates light orientation characteristics from information on light detected by the imaging element 4. For example, light detected by the imaging element 4 differs from the light orientation characteristics of an actual object to be measured depending on an error due to the distortion of the lens 1, an error due to the angle of incident light to the diffuser panel 2 and to the in-plane uniformity of the diffuser panel 2, and a difference in light intensity between the diffuser panel 2 and a distant field, etc. The arithmetic processing unit can also calculate the actual light orientation characteristics by correcting the above-described errors, etc., from information on the light detected by the imaging element 4.

When the distortion of the lens 1 is to be corrected, for example, a sheet of chessboard that has a known size is placed while changing the position within the screen of the imaging element 4, and respective images are obtained. Next, the coordinates of a lattice point are extracted from each image, and a correction parameter is calculated from the symmetry between the real space coordinates and the camera coordinates. The arithmetic processing unit may correct the distortion of the lens 1 based on the information on the light detected by the imaging unit 4 and on the correction parameter so as to calculate the actual light orientation characteristics.

Moreover, when the error due to the angle of incident light to the diffuser panel 2 and to the in-plane uniformity of the diffuser panel 2 is to be corrected, for example, light is directly emitted to the diffuser panel by a laser pointer from the second position P, the position (x, y) of light emitted to the diffuser panel 2 is changed variously, and pieces of image data are obtained by the imaging element 4. Next, with reference to the luminance of the light from the laser pointer, a correction coefficient K (x, y) expressed by the following formula is obtained.

$K(x,y)$=luminance of light at position $(x,y)$/luminance of light from laser pointer The arithmetic processing unit may correct the error due to the angle of the incident light to the diffuser panel 2 and to the in-plane uniformity of the diffuser panel 2 based on the information on the light detected by the imaging element 4 and the above-described correction coefficient K(x, y).

Moreover, regarding the difference in light intensity between the diffuser panel 2 and the distant field, when a distance between an apparent light source and the diffuser panel 2 is D, a distance from the optical axis on the diffuser panel 2 is r, an incident angle of light relative to the optical axis from the light source to the lens 1 is θ, an incident angle of light relative to the optical axis from the lens 1 to the diffuser panel 2 is θ/m, a light intensity at the diffuser panel 2 is $I_r(r)$, and a light intensity at the distant field through the lens 1 is $I'_\theta(\theta/m)$, the following formula is satisfied.

$$I_r(r) = \frac{I'_\theta(\theta/m)\cos^3(\theta/m)}{D^2}$$

Moreover, when the light intensity of the distant field with the light not passing through the lens 1 pass is $I_\theta(\theta)$, $$I'_\theta(\theta/m) = \frac{I_\theta(\theta)m\sin\theta}{\sin(\theta/m)}$$

is satisfied, and thus the following formula is accomplished.

$$I_\theta(\theta) = \frac{I_r(r)D^2\sin(\theta/m)}{m\sin\theta\cos^3(\theta/m)}$$

Hence, the arithmetic processing unit may correct the difference in the light intensity between the diffuser panel 2 and the distant field based on the information on the light detected by the imaging element 4 and the above-described formula.

A display unit displays the light orientation characteristics of the light detected by the imaging element 4. Accordingly, the light orientation characteristics of the measurement object 100 can be easily checked. An example display unit is any known display unit.

Moreover, among the lights diffused by the diffuser panel 2, the lights other than the light that directly enters the imaging element 4 become noises when entering the imaging element 4 with reflection, etc. Hence, it is preferable that the optical system device according to the present disclosure should include an antireflection member 5 which is placed around the diffuser panel 2 so as to be in parallel with the optical axis of the lens 1 and which absorbs incident light from the diffuser panel 2. When the incident light from the diffuser panel 2 is absorbed by the antireflection member 5, such light can be prevented from being reflected and from entering the imaging element 4.

Figure 5:
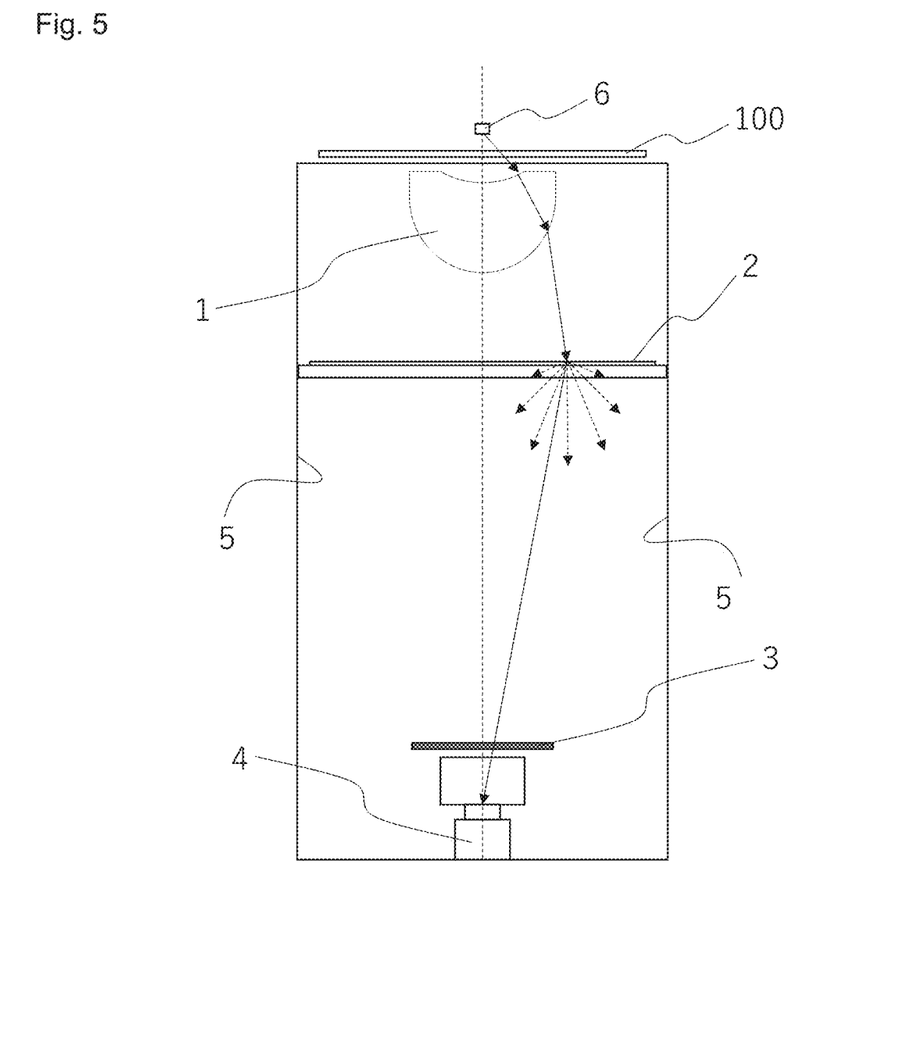
FIG. 5 is a schematic cross-sectional view illustrating another optical system device according to the present disclosure.

Furthermore, it is not necessary when the measurement object 100 itself emits light like a light emitting element, but when the measurement object 100 is an optical element, such as a Micro Lens Array (MLA) or a Diffraction Optical Element (DOE), as illustrated in FIG. 5, a light source 6 which emits light to the measurement object 100 is necessary. The light source 6 is not limited to any particular one as far as it can emit light to the measurement object 100 placed at the first position O, but for example, a vertical resonator surface light emitting laser (VCSEL) may be applied. Note that the distance between the light source 6 and the first position O is arbitrary as far as light can be emitted to the measurement range of the measurement object 100.

Figure 6:
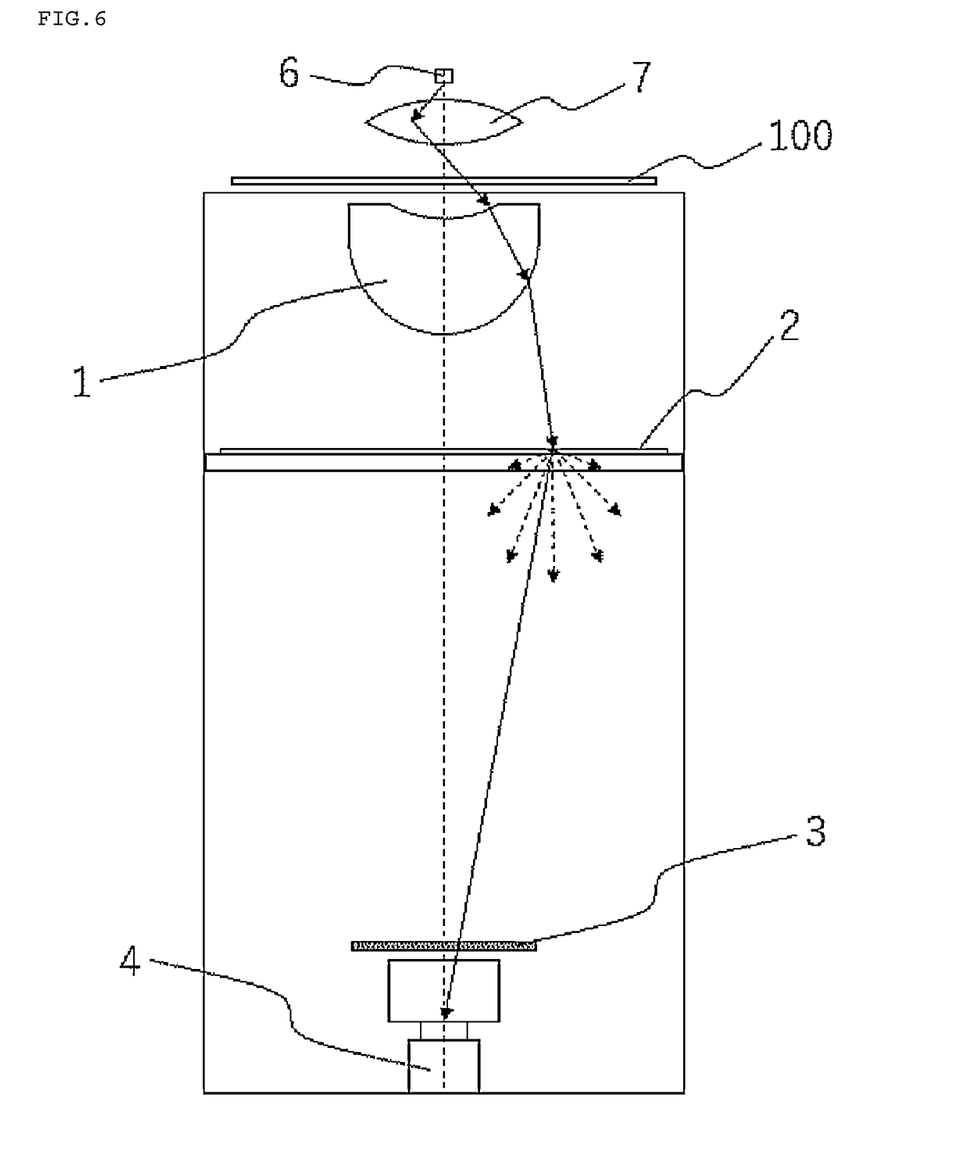
FIG. 6 is a schematic cross-sectional view illustrating the other optical system device according to the present disclosure.

Moreover, regarding the measurement object like a micro lens array, a total inspection at the time of mass production is desirable. In this case, although the position control on the measurement object 100 relative to the light source 6 is executed by an actuator, etc., when the distance between the light source 6 and the measurement object 100 is short, there is a possibility of contact. Accordingly, as illustrated in FIG. 6, the optical system device of the present disclosure may include an imaging lens 7 which forms an image with light from the light source 6, and which emits it to the first position O. When the light from the light source 6 is emitted to the first position O through the imaging lens 7, the distance between the measurement object 100 and the light source 6 can be extended. Note that the distance between an image formation position and the first position O is arbitrary as far as light can be emitted to the measuring range of the measurement object 100.

A polarization filter is an optical element that allows only light polarized in a certain direction to pass through. When the measurement object is one that polarizes light in a certain direction like a polarizer or a phase difference element, only light polarized in the predetermined direction can be measured by using a polarization filter. The polarization filter may include rotating means that rotates the polarization filter. The polarization filter may be placed between the measurement object 100 and the imaging element 4, preferably, between the diffuser panel 2 and the imaging element 4, and more preferably immediately ahead of the imaging element 4 so as to prevent light other than the light polarized in the certain direction from entering the imaging element 4.

REFERENCE SIGNS LIST

F Incident surface
B Emit surface
O First position
P Second position
1 Lens
2 Diffuser panel
3 Wavelength selective filter
4 Imaging element
5 Antireflection member
6 Light source
7 Imaging lens
100 Measurement object

The invention claimed is:
1. An optical system comprising:
a lens formed so as to emit incident light from a first position at an irradiation angle Θ relative to an optical axis at an emit angle Θ/m (where m>1) relative to the optical axis, and formed in such a way that apparent positions of emitted lights all begin from a second position;
a diffuser panel that diffuses the light emitted from the lens; and
an imaging element that detects the light from the diffuser panel.

2. The optical system device according to claim 1, further comprising a wavelength selective filter that allows only light with a certain wavelength to pass through.

3. The optical system device according to claim 1, further comprising an electronic shutter that adjusts a time at which the light enters the imaging element.

4. The optical system device according to claim 1, further comprising an arithmetic processing unit that calculates light orientation characteristics from information on the light detected by the imaging element.

5. The optical system device according to claim 1, further comprising a display device that displays the light orientation characteristics of the light detected by the imaging element.

6. The optical system device according to claim 1, further comprising an antireflection member which is placed around the diffuser panel so as to be in parallel with the optical axis of the lens and which absorbs incident light from the diffuser panel.

7. The optical system device according to claim 1, further comprising a light source that emits light to the first position.

8. The optical system device according to claim 1, further comprising an imaging lens which forms an image with the light from the light source, and which emits the imaging light to the first position.

9. The optical system device according to claim 1, further comprising a polarization filter that allows only light polarized in a certain direction to pass through.

10. The optical system device according to claim 2, further comprising an electronic shutter that adjusts a time at which the light enters the imaging element.

11. The optical system device according to claim 10, further comprising a light source that emits light to the first position.

12. The optical system device according to claim 2, further comprising an arithmetic processing unit that calculates light orientation characteristics from information on the light detected by the imaging element.

13. The optical system device according to claim 12, further comprising a light source that emits light to the first position.

14. The optical system device according to claim 2, further comprising a display device that displays the light orientation characteristics of the light detected by the imaging element.

15. The optical system device according to claim 2, further comprising an antireflection member which is placed around the diffuser panel so as to be in parallel with the optical axis of the lens and which absorbs incident light from the diffuser panel.

16. The optical system device according to claim 2, further comprising a light source that emits light to the first position.

17. The optical system device according to claim 2, further comprising an imaging lens which forms an image with the light from the light source, and which emits the imaging light to the first position.

18. The optical system device according to claim 2, further comprising a polarization filter that allows only light polarized in a certain direction to pass through.

19. An optical system comprising:
a lens formed so as to emit incident light from a first position at an irradiation angle Θ relative to an optical axis at an emit angle Θ/m (where m>1) relative to the optical axis, and formed in such a way that apparent positions of emitted lights all begin from a second position;

a diffuser panel that diffuses the light emitted from the lens; and an antireflection member which is placed around the diffuser panel so as to be in parallel with the optical axis of the lens and which absorbs incident light from the diffuser panel.

20. An optical system comprising:

a lens formed so as to emit incident light from a first position at an irradiation angle $\Theta$ relative to an optical axis at an emit angle $\Theta/m$ (where m>1) relative to the optical axis, and formed in such a way that apparent positions of emitted lights all begin from a second position;

a diffuser panel that diffuses the light emitted from the lens; and an imaging lens which forms an image with the light from the light source, and which emits the imaging light to the first position.

* * * * *